US006288886B1

(12) United States Patent
Sato et al.

(10) Patent No.: US 6,288,886 B1
(45) Date of Patent: Sep. 11, 2001

(54) HIGH VOLTAGE CAPACITOR AND MAGNETRON

(75) Inventors: Kazuo Sato; Setsuo Sasaki; Tsukasa Satoh; Isao Fujiwara; Yoshiyuki Itoh, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/515,322

(22) Filed: Feb. 29, 2000

(30) Foreign Application Priority Data

Mar. 5, 1999 (JP) .................................................. 11-058107

(51) Int. Cl.[7] ............................ H01G 4/35; H01G 4/236; H01G 4/005
(52) U.S. Cl. ........................... 361/302; 361/307; 361/303
(58) Field of Search ...................... 361/301.1, 1, 301.3, 361/302, 303, 306.1, 306.2, 307, 330

(56) References Cited

U.S. PATENT DOCUMENTS

| 4,370,698 | * | 1/1983 | Sasaki | 361/302 |
| 4,768,129 | * | 8/1988 | Saskai et al. | 361/302 |
| 4,811,161 | * | 3/1989 | Sasaki et al. | 361/302 |
| 4,985,802 | * | 1/1991 | Ueno et al. | 361/302 |
| 5,113,309 | * | 5/1992 | Sasaki et al. | 361/302 |
| 5,142,436 | * | 8/1992 | Lee et al. | 361/302 |
| 5,544,002 | * | 8/1996 | Iwaya et al. | 361/302 |
| 5,798,906 | * | 8/1998 | Ando et al. | 361/520 |

FOREIGN PATENT DOCUMENTS

| 63-269509 | * | 11/1988 | (JP) | H01G/4/42 |
| 4-040524 | | 4/1992 | (JP) . | |
| 8-316099 | | 11/1996 | (JP) . | |

* cited by examiner

Primary Examiner—Dean A. Reichard
Assistant Examiner—Eric Thomas
(74) Attorney, Agent, or Firm—Oblon, Spivak, McClelland, Maier & Neustadt, P.C.

(57) ABSTRACT

A capacitor constituted of a dielectric ceramic material is provided with through holes, with electrodes formed at the two surfaces at which the through holes open. One of the electrodes is secured onto a raised portion of a grounding metal. Conductors which pass through the capacitor and the grounding metal are electrically connected to an electrode opposite the electrode secured onto a raised portion of the grounding metal. Insulating resins fill the spaces around the capacitor. One end surface of an insulating cover is set facing opposite an inner surface of the raised portion of the grounding metal over a gap with an inner insulating resin filling the gap.

6 Claims, 5 Drawing Sheets

HIGH VOLTAGE CAPACITOR AND MAGNETRON

BACKGROUND OF THE INVENTION

1. Field of the Invention

The present invention relates to a high voltage capacitor and magnetron having a filter constituted of the high voltage capacitor.

2. Discussion of the Background

Well known examples of high voltage capacitors of this type in the prior art include those disclosed in Japanese Unexamined Patent Publication No. 316099/1996 and Japanese Unexamined Utility Model Publication No. 40524/1992. They generally adopt a structure achieved in which two through holes are formed over a distance from each other in a dielectric ceramic material constituting the capacitor. Individual electrodes that are independent of each other and a common electrode shared by the individual electrodes are provided at the two surfaces of the dielectric ceramic material at which the through holes open. The common electrode is secured onto a raised portion of a grounding metal by a means such as soldering. Conductors are inserted in the through holes at the capacitor and holes at the grounding metal. The conductors are soldered to the individual electrodes at the capacitor using electrode connectors or the like. An insulating case is fitted at the external circumference of the raised portion of the grounding metal, so as to enclose the capacitor. An insulating cover is fitted at the other surface of the grounding metal, so as to enclose the conductors. The insulating cover is mounted so that it comes into close contact with the internal circumferential surface of the raised portion of the grounding metal. Then, the insulating case and the spaces inside and outside of the capacitor enclosed by the insulating case are filled with a thermosetting insulating resin such as an epoxy resin to assure moisture resistance and good insulation.

However, the insulating cover is simply fitted so that it comes into close contact with the internal circumferential surface of the raised portion of the grounding metal and the insulating cover and the grounding metal are not bonded. As a result, the stress, which repeatedly occurs while the insulating resin is becoming hardened and contracting and during operation of the capacitor causes a gap to form at the boundary of the insulating cover and the internal circumferential surface of the raised portion of the grounding metal and also induces formation of a gap between the insulating resin and the grounding metal and between the insulating resin and the dielectric ceramic material. Thus, high voltage capacitors of this type in the prior art pose a risk of early defects occurring due to deterioration of characteristics and shorting occurring between electrodes.

Main causes of the gap formed between the insulating cover and the grounding metal include the stress occurring while the thermosetting insulating resin such as an epoxy resin is becoming hardened and contracting and the stress attributable to the electrostrictive phenomenon occurring at the dielectric ceramic material constituting the capacitor.

The main constituent of the dielectric ceramic material constituting the capacitor is barium titanate. Such a dielectric ceramic material is a ferroelectric material that belongs to the piezoelectric crystal class. A ferroelectric material belonging to the piezoelectric crystal class imparts a reverse piezoelectric effect. As a result, when a high AC voltage is applied, mechanical energy is generated inside the dielectric ceramic material constituting the capacitor. For instance, if this type of high voltage capacitor is employed in a filter of a magnetron in a microwave oven, a high AC voltage for oscillating the magnetron is applied to the capacitor. When such a high AC voltage is applied to the dielectric ceramic material the reverse piezoelectric effect mentioned earlier converts the electrical energy to mechanical energy. This results in the dielectric ceramic material expanding while the voltage is being applied and contracting to regain its original state when the voltage is not applied. A voltage of approximately 4 $kV_{O-P}$ having a commercial frequency or a frequency in the range of 20 kHz to 40 kHz is applied to oscillate the magnetron in a microwave oven. In addition, a transient voltage of 0 to 40 $kV_{P-P}$ is applied immediately before the magnetron starts to oscillate. In response to these AC voltages, the dielectric ceramic material constituting the capacitor repeats a process of expanding and contracting. This is referred to as an electrostrictive phenomenon of a dielectric ceramic material.

However, since the insulating cover is merely fitted in close contact with the internal circumferential surface of the raised portion of the grounding metal, the insulating cover and the internal circumferential surface are not bonded. This causes a gap to form at the boundary of the insulating cover and the internal circumferential surface of the raised portion of the grounding metal while the dielectric ceramic material constituting the capacitor repeats expanding and contracting in response to the AC voltage and, furthermore, induces separation at the interface of the insulating resin and the grounding metal.

SUMMARY OF THE INVENTION

It is an object of the present invention to provide a high voltage capacitor achieving a high degree of reliability in which deterioration of the characteristics and electrical shorting are avoided by increasing the bonding force at the interface of the grounding metal and the insulating resin filling the inside of the grounding metal and thus preventing any separation from occurring at the interface between them.

In order to achieve the object described above, the high voltage capacitor according to the present invention comprises at least one grounding metal, at least one capacitor, at least one conductor, at least one insulating tube, at least one insulating cover and an insulating resin.

The grounding metal is provided with a raised portion at one surface thereof, with the raised portion having a hole from one surface to another surface and an internal space that is continuous with the hole.

The capacitor, which includes a dielectric ceramic material having a through hole, assumes a structure provided with an electrode at each of the two surfaces at which the through hole in the dielectric ceramic material opens, with one of the electrodes secured onto the one surface of the grounding metal.

The conductor, which passes through the capacitor and the grounding metal, is connected to the other electrode achieving electrical continuity. The insulating tube covers the conductor.

The insulating cover, which is provided at the other surface of the grounding metal, has one end thereof inserted in the internal space at the raised portion. The insulating resin fills the space around the capacitor at one surface of the grounding metal and also fills the space around the capacitor inside the insulating cover.

When the high voltage capacitor assuming the structure described above is employed in a magnetron in a microwave oven, a high voltage capacitor that absorbs noise traveling through the conductors is achieved. The filtering function of the capacitor is achieved by using the conductors as power supply terminals and connecting the capacitor between the conductors and the grounding metal.

In addition, since the grounding metal is provided with a hole and the capacitor, too, is provided with a through hole passing through the dielectric ceramic material, the through terminal which achieves a potential higher than that of the ground can be mounted between the grounding metal achieving the ground potential and one of the electrodes at the capacitor while assuring a sufficient degree of electrical insulation achieved by the through holes.

Furthermore, since the insulating resin fills the spaces around the capacitor, a higher degree of reliability is achieved in reliability tests such as high temperature load tests and moisture resistance load tests or when the capacitor is utilized in a hot and highly humid environment.

The present invention is characterized in that one end of the insulating cover faces opposite the inner surface of the raised portion of the grounding metal over a distance with the insulating resin filling the space in the generally adopted structure explained earlier.

In the structure described above, in which the one end of the insulating cover is closed off by the insulating resin filling the space and the insulating resin filling the space is bonded to the inner surface of the grounding metal, the force with which the insulating resin and the grounding metal are bonded to each other exceeds the separating force occurring between the insulating resin and the grounding metal while the resin is becoming hardened and contracting or while the capacitor is in use, thereby greatly improving the moisture resisting performance. Consequently, the high voltage capacitor is fully capable of withstanding the mechanical stress attributable to the hardening/contraction of the insulating resin or the electrostrictive phenomenon occurring at the dielectric ceramic material during use.

Moreover, since the grounding metal and the insulating cover are three-dimensionally bonded to each other by the insulating resin, the bonding force between them is greatly improved so that even when there is a contraction force of the insulating resin in the radial direction, a gap is not formed between the grounding metal and the insulating cover readily.

BRIEF DESCRIPTION OF THE DRAWINGS

A more complete appreciation of the invention and many of the attendant advantages thereof become better understood when referring to the following detailed description of the accompanied drawings, in which.

DETAILED DESCRIPTION OF THE PREFERRED EMBODIMENTS

Figure 1:
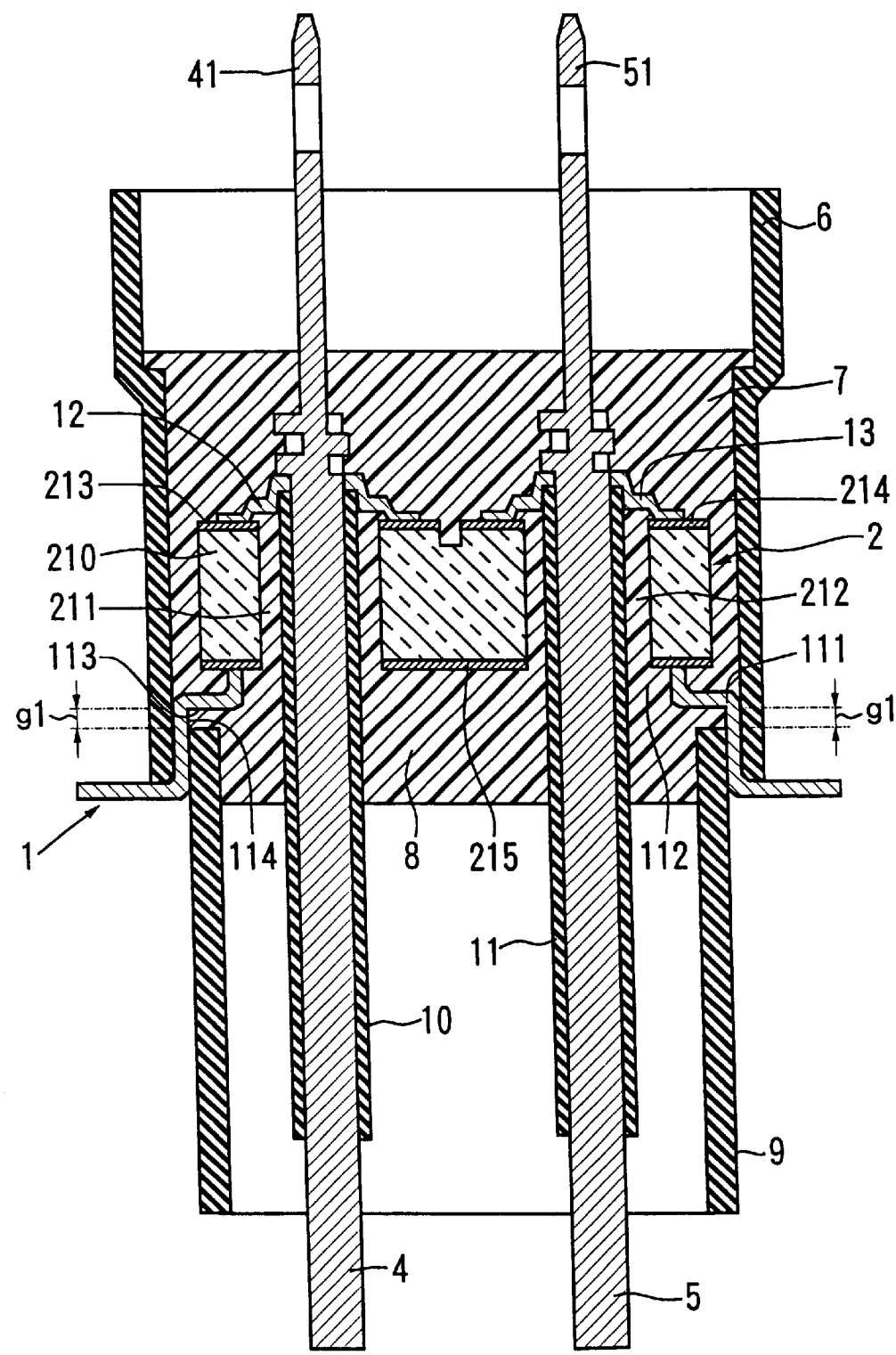
FIG. 1 is a sectional front view of an example of the high voltage capacitor according to the present invention.
Figure 2:
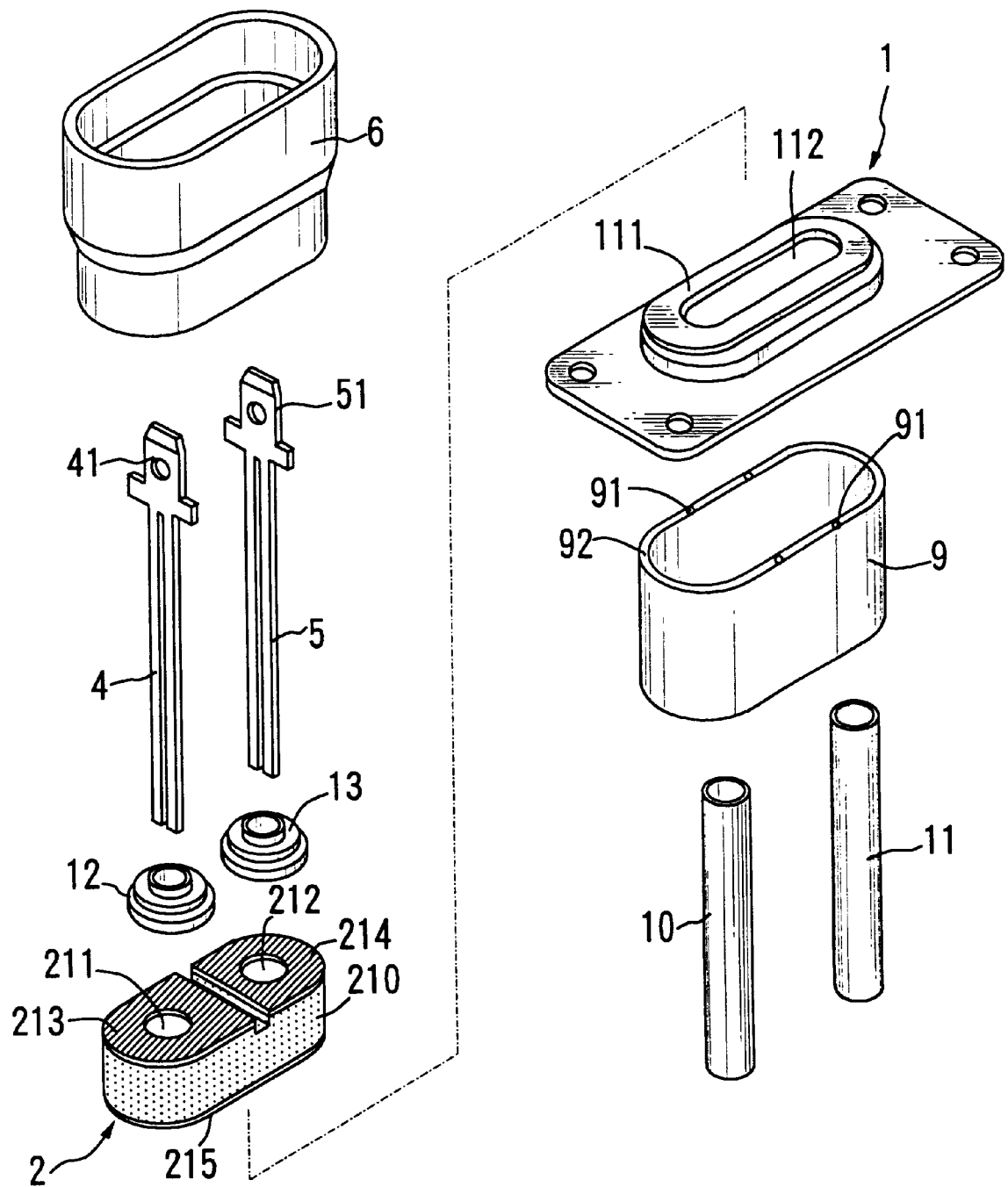
FIG. 2 is an exploded perspective of the high voltage capacitor in FIG. 1.

Referring to FIGS. 1 and 2, the high voltage capacitor includes a grounding metal 1, a capacitor 2, conductors 4 and 5, an insulating case 6, an outer insulating resin 7, an inner insulating resin 8, an insulating cover 9 and insulating tubes 10 and 11 constituted of silicon or the like.

The grounding metal 1 is provided with a raised portion 111 at one surface thereof, with the raised portion 111 having a hole 112. At the capacitor 2, which is provided on the raised portion 111, an electrode 215 is secured to the raised portion 111 by a means such as soldering. The conductors 4 and 5 pass through the through holes 211 and 212 of the capacitor 2 respectively and also through the hole 112 and are connected to electrodes 213 and 214 respectively via electrode conductors 12 and 13 achieving electrical continuity.

The outer insulating resin 7 fills the space around the capacitor 2 at one surface of the grounding metal 1 and is in close contact with the surface of the dielectric ceramic material 210. The inner insulating resin 8, which fills the through holes 211 and 212 of the capacitor 2 at the other surface of the grounding metal 1, is in close contact with the surface of the dielectric ceramic material 210. The outer insulating resin 7 and the inner insulating resin 8 may be constituted of a thermosetting resin such as a urethane resin or an epoxy resin. Alternatively, they may be constituted of a phenol resin or a silicon resin.

The insulating tubes 10 and 11 cover the portions of the conductors 4 and 5 that are located inside the holes 211 and 212 respectively.

The insulating case 6 and the insulating cover 9 may be constituted of polybutylene terephthalate, polyethylene terephthalate or modified melamine. The insulating case 6 is fitted at the external circumference of the raised portion 111 of the grounding metal 1. The insulating cover 9 is fitted at the internal circumference of the raised portion 111 of the grounding metal 1. The outer insulating resin 7 fills the space inside the insulating case 6, whereas the inner insulating resin 8 fills the inside of the insulating cover 9, the inside of the raised portion 111 of the grounding metal 1 and the through holes 211 and 212 of the capacitor 2.

The composition of the dielectric ceramic material 210 constituting the capacitor 2 is of the known art. A specific example is a composition having $BaTiO_3$—$BaZrO_3$—$CaTiO_3$—$MgTiO_3$ as its main constituent and one or a plurality of types of additives.

The capacitor 2 is provided on the grounding metal 1 with its electrode 215 fixed to one surface of the grounding metal 1. The conductors 4 and 5 pass through the capacitor 2 and the grounding metal 1 and are connected to the electrodes 213 and 214 achieving electrical continuity. Thus, in an application in a magnetron in a microwave oven, a high voltage capacitor that absorbs noise traveling through the conductors 4 and 5 is achieved. The filtering function of the capacitor 2 is achieved by using the conductors 4 and 5 as power supply terminals 41 and 51 and connecting the capacitor 2 between the conductors 4 and 5 and the grounding metal 1.

The grounding metal 1 is provided with at least one hole 112 and the capacitor 2 is provided with at least one through hole 211 or 212 passing through the dielectric ceramic material 210. Thus, a sufficient degree of electrical insulation is assured by the presence of the through holes 211 and 212 for the conductors 4 and 5 having a potential higher than the ground potential, which are provided between the grounding metal 1 having the ground potential and the electrode 215 of the capacitor 2.

Since the insulating resins 7 and 8 fill the spaces around the capacitor 2, a higher degree of reliability is achieved in reliability tests such as a high temperature load tests and moisture resistance load tests or when the high voltage capacitor is used in a hot and highly humid environment.

The present invention is characterized in that one end surface 92 of the insulating cover 9 is positioned facing opposite an inner surface (stage lower surface) 113 of the raised portion 111 of the grounding metal 1 over a gap g1 with the inner insulating resin 8 filling the gap g1 in the generally adopted structure explained earlier.

In the structure described above in which one end of the insulating cover 9 is closed off by the inner insulating resin 8 filling the gap g1 and the inner insulating resin 8 filling the inside of the gap g1 is bonded to the stage lower surface 113 and an inner surface 114 of the grounding metal 1, the force with which the inner insulating resin 8 and the grounding metal 1 are bonded to each other exceeds the separation force occurring between the inner insulating resin and the grounding metal 1 during the hardening/contraction of the inner insulating resin 8 or during use. Thus, the high voltage capacitor is fully capable of withstanding the mechanical stress occurring due to the hardening/contraction of the inner insulating resin 8 or the electrostrictive phenomenon occurring at the dielectric ceramic material 210 constituting the capacitor 2 during use and achieves a great improvement in its moisture resistance.

In addition, the gap g1 has a three-dimensional shape enclosed by the top surface 113 and the inner surface 114 of the grounding metal 1 and the one end surface of the insulating cover 9. Furthermore, the inner insulating resin 8 fills inside the grounding metal 1, the insulating cover 9 and the dielectric ceramic material 210 constituting the capacitor 2. As a result, the grounding metal 1 and the insulating cover 9 are bonded to each other three-dimensionally by the inner insulating resin 8 to achieve a great improvement in the force with which the grounding metal 1 and the insulating cover 9 are bonded to each other so that even when there is a contraction force at the inner insulating resin 8 along the radial direction, this contraction is inhibited to prevent formation of a gap between the grounding metal 1 and the insulating cover 9.

Table I presents the relationship between the gap g1 and the results of a moisture resistance test. The moisture resistance test was conducted by leaving sample groups each comprising 45 sample units in an atmosphere with the temperature set to 45° C. and the relative humidity set at 90% RH over varying lengths of time as shown in Table I and then applying AC 10 KV (r.m.s.) for 5 seconds. In Table I, the resulting number of moisture resistance defects/number of samples (45) in each group is presented.

TABLE I

| | varying lengths of time in moisture resistance test (hr) | | | |
|---|---|---|---|---|
| g1 (mm) | 0 | 240 | 500 | 1000 |
| 0 | 0/45 | 0/45 | 0/45 | 5/45 |
| 0.1 | 0/45 | 0/45 | 0/45 | 0/45 |
| 0.2 | 0/45 | 0/45 | 0/45 | 0/45 |
| 0.4 | 0/45 | 0/45 | 0/45 | 0/45 |

As Table I indicates, no moisture resistance defects occurred in any of the 45 samples in any of the individual sample groups with the gap g1 set at 0.1 mm or larger, even when they were left in the atmosphere over 1000 hours. This means that by setting the gap g1 at 0.1 mm or larger, a high degree of moisture resistance can be assured. When the gap g1 is set at 0.1 mm or larger, the layer thickness of the inner insulating resin 8 inside the gap g1 can be set to 0.1 mm or larger.

Of the 45 samples with the gap g1 set smaller than 0.1 mm, which were left in the atmosphere for 1000 hours, five sample units with moisture resistance defects were observed. Thus, good results were not achieved when the gap g1 was smaller than 0.1 mm. This is assumed to be attributable to insufficient penetration inside the gap g1 by the inner insulating resin 8 due to its viscosity or the like when the gap g1 is smaller than 0.1 mm. In addition, when the gap g1 is smaller than 0.1 mm, the moisture resistance tends to be more readily affected by inconsistency in the viscosity of the inner insulating resin 9 filling the gap g1. This, too, also prevents the inner insulating resin 8 from fully penetrating the space inside the gap g1.

Figure 3:
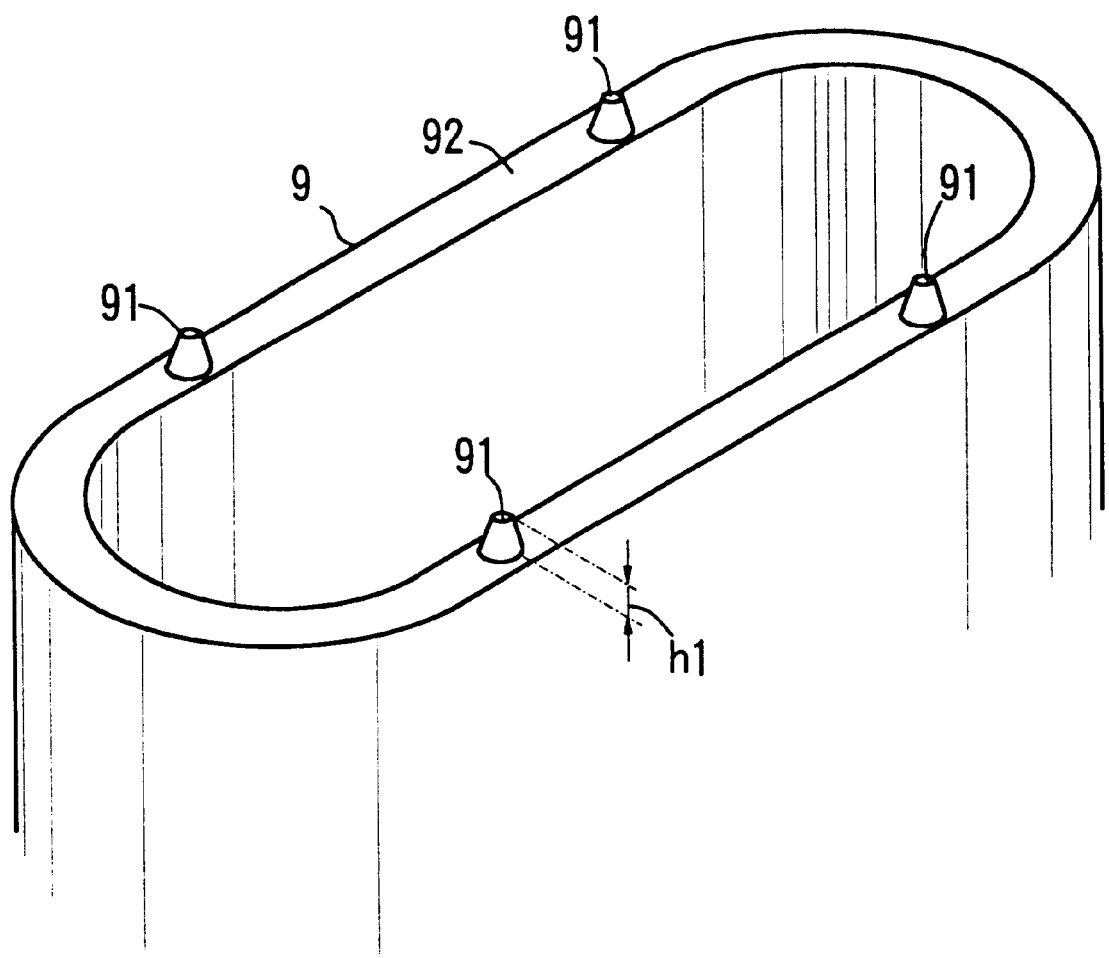
FIG. 3 is an enlarged perspective of the insulating cover utilized in the high voltage capacitor according to the present invention.

Various structures may be adopted to constitute a means for creating the gap g1 between the inner surface of the grounding metal 1 and the insulating cover 9. Some of such examples are explained next. First, FIG. 3 presents an example having projections 91 at the end surface 92 of the insulating cover 9. The projections 91 may be formed in any of various shapes including a semi-spherical shape, an angular shape, a trapezoidal shape and a truncated conical shape. The projections 91 may be formed as an integrated part of the insulating cover 9 or they may be provided by implanting separate members. In addition, the quantity of the projections 91 is arbitrary. In the embodiment, a total of four projections 91 are provided, with two each present at the two sides facing opposite each other.

Table II presents the relationship between the height h1 of the projections 91 and the results of a moisture resistance test. The moisture resistance test was conducted by leaving sample groups each comprising 45 samples in an atmosphere with the temperature set to 45° C. and the relative humidity set to 90% RH over varying lengths of time as shown in Table I and then applying AC 10 KV (r.m.s.) for 5 seconds. Table II indicates the resulting number of moisture resistance defects/number of samples (45) in each group. The moisture resistance is evaluated over a test period of 1000 hours.

TABLE II

| | varying lengths of time in moisture resistance test (hr) | | | |
|---|---|---|---|---|
| h1 (mm) | 0 | 240 | 500 | 1000 |
| 0 | 0/45 | 0/45 | 0/45 | 5/45 |
| 0.2 | 0/45 | 0/45 | 0/45 | 0/45 |
| 0.3 | 0/45 | 0/45 | 0/45 | 0/45 |

As Table II indicates, no moisture resistance defect occurred in any of the 45 sample units in any of the sample groups having the projections 91 formed as integrated parts of the insulating cover 9 with their height hi set to 0.2 mm or larger, even when they were left in the atmosphere for 1000 hours in the moisture resistance test. This means that by setting the height hi of the projections 91 at 0.2 mm or larger, a high degree of moisture resistance can be assured.

If the height hi of the projections 91 is less than 0.2 mm, it becomes difficult to assure the dimension of 0.1 mm or larger for the gap g1 at all times since the projections 21 tend to become squashed readily when the insulating cover 9 is inserted at the grounding metal 1. Even by taking into consideration such squashing of the projections 91 occurring when the insulating cover 9 is inserted at the grounding metal 1, a gap g1 of 0.1 mm or larger can be assured as long as the height of the projections 91 is set at 0.2 mm or larger.

Figure 4:
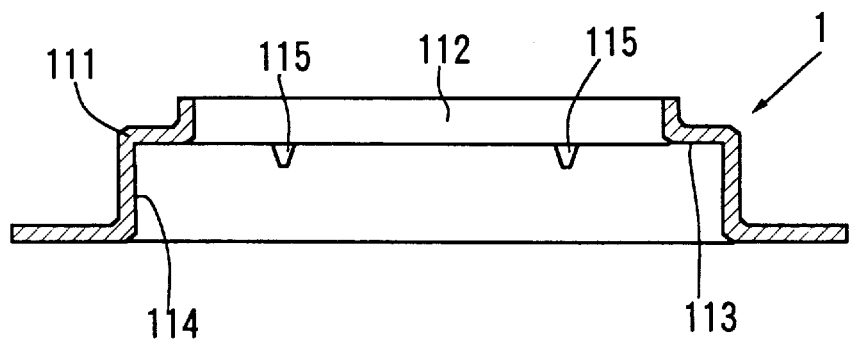
FIG. 4 is a sectional front view of the grounding metal utilized in the high voltage capacitor according to the present invention.
Figure 5:
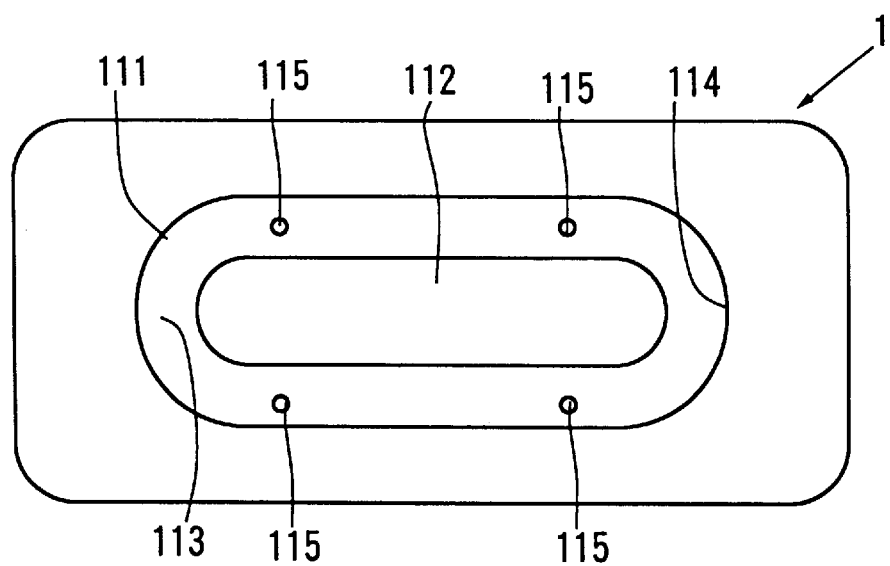
FIG. 5 is a bottom view of the grounding metal in FIG. 4.

Projections may be provided at the inner surface of the grounding metal 1. An example of this structure is illustrated in FIGS. 4 and 5. FIGS. 4 and 5 present a structural example achieved by providing four projections 115 at the inner surface 113 of the grounding metal 1 facing opposite the insulating cover 9. The quantity, the shape, the positions and the like of the projections 115 are arbitrary.

Figure 6:
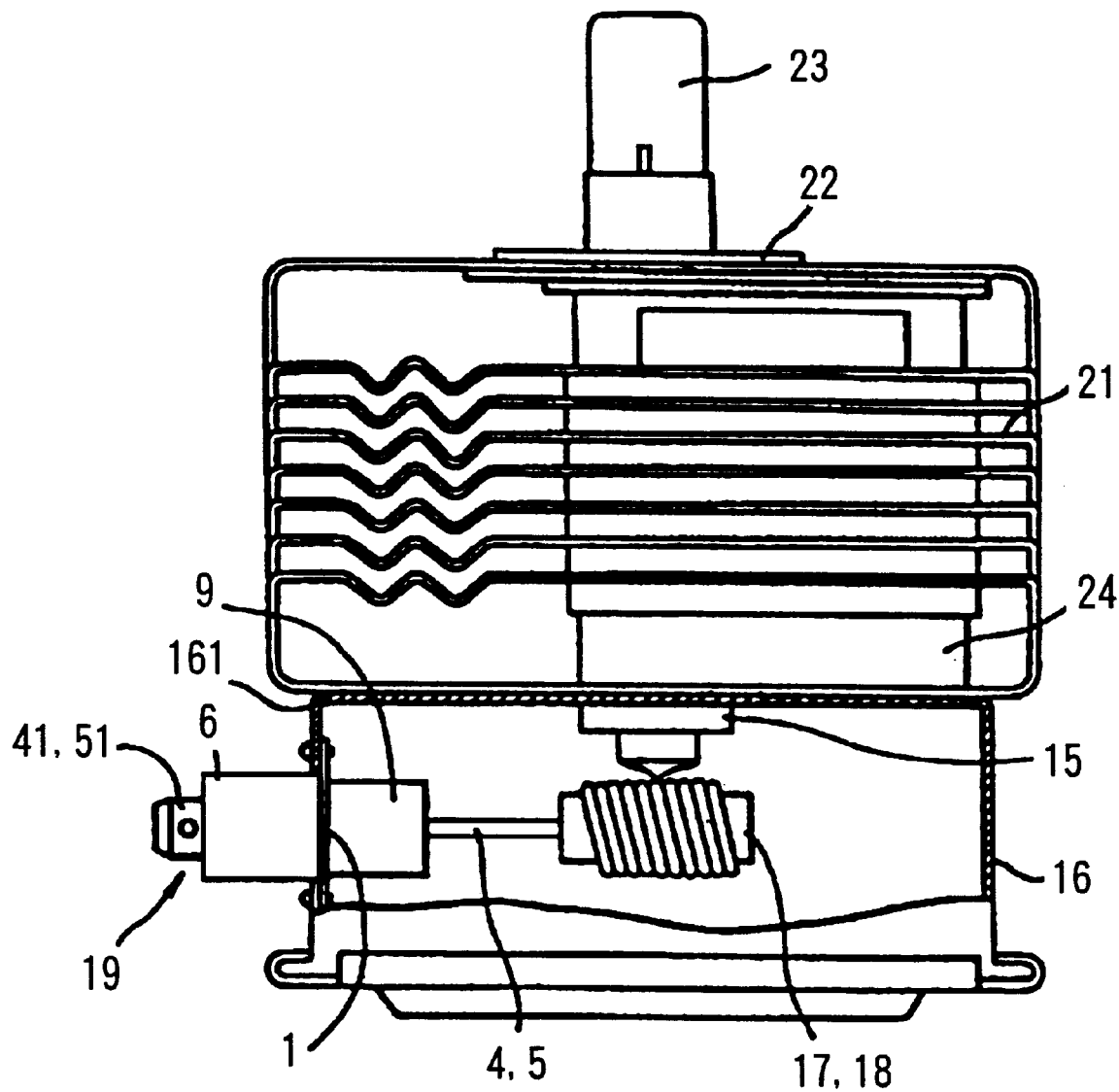
FIG. 6 is a magnetron employing the high voltage capacitor according to the present invention.

FIG. 6 is a partial breakaway sectional view of a magnetron utilizing the high voltage capacitor according to the present invention as a filter, with reference number 15 indicating a cathode stem, reference number 16 indicating a filter box, reference numbers 17 and 18 each indicating an inductor and reference number 19 indicating a high voltage capacitor according to the present invention utilized in combination with the inductors 17 and 18 as a filter. The filter box 16 covers the cathode stem 15, and the high voltage capacitor 19 passes through a hole provided at a side plate 161 of the filter box 16 so as to expose its outer insulating resin 7 to the outside and is securely mounted at the side plate 161 of the filter box 16 at the grounding metal 1. The inductors 17 and 18 are connected in series between the cathode terminal of the cathode stem 15 and the conductors 4 and 5 of the high voltage capacitor 19 inside the filter box 16. Reference number 21 indicates cooling fins, reference number 22 indicates a gasket, reference number 23 indicates an RF output and reference number 24 indicates a magnet.

A voltage of approximately 4 k $V_{O-P}$ having commercial frequency or a frequency within the range of 20 kHz to 40 kHz is supplied to the conductors 4 and 5 of the high voltage capacitor 19 to oscillate the magnetron in the microwave oven. The high voltage thus supplied is then supplied to the magnetron from the conductors 4 and 5 via the inductors 17 and 18. Any noise traveling through the conductors 4 and 5 is absorbed through the filtering function achieved by the capacitor 2 and the inductors 17 and 18.

In addition, since the spaces around the capacitor 2 are filled by the insulating resins 7 and 8, a sufficient degree of reliability is assured even when the high voltage capacitor is utilized in a microwave oven which is a hot, highly humid environment.

Furthermore, as illustrated in FIGS. 1 to 6, one end of the insulating cover 9 is set facing opposite the inner surface (stage lower surface) 113 of the raised portion 111 of the grounding metal 1 over the gap g1 with the inner insulating resin 8 filling the gap g1 to improve the moisture resistance of the high voltage capacitor 19. Thus, when the high voltage capacitor 19 is utilized in a microwave oven which is a hot, humid environment, an even higher degree of reliability is assured.

As explained above, according to the present invention, a highly reliable high voltage capacitor in which deterioration in the characteristics and electrical shorting are avoided by increasing the bonding force at the interface of the grounding metal and the insulating resin filling inside the grounding metal and thus, preventing separation at the interface of the grounding metal and the insulating resin.

What is claimed is:

1. A high voltage capacitor, comprising:
   at least one grounding metal having a raised portion provided with a hole and an internal space continuous with said hole;
   at least one capacitor including a dielectric ceramic material provided with at least one through hole and electrodes at surfaces where said at least one through hole opens, with one of said electrodes secured onto said raised portion;
   at least one conductor passing through said hole of said grounding metal and said at least one through hole of said at least one capacitor, and being electrically connected to another of said electrodes;
   at least one insulating tube covering said conductor;
   at least one insulating cover having one end inserted in said internal space; and
   an insulating resin filling spaces around said at least one conductor, around said raised portion and in said internal space, wherein:
   said one end of said insulating cover faces an inner surface of said internal space of said raised portion over a gap and said insulating resin fills said gap; and
   said one end of said insulating cover is provided with a plurality of projections facing opposite said inner surface of said internal space of said raised portion.

2. The high voltage capacitor of claim 1, wherein the layer thickness of said insulating resin at said gap is set at 1.1 mm or larger.

3. A magnetron utilizing a high voltage capacitor as a filter, wherein said high voltage capacitor is constituted of the high voltage capacitor of claim 1.

4. A high voltage capacitor, comprising:
   at least one grounding metal having a raised portion provided with a hole and an internal space continuous with said hole;
   at least one capacitor including a dielectric ceramic material provided with at least one through hole and electrodes at surfaces where said at least one through hole opens, with one of said electrodes secured onto said raised portion;
   at least one conductor passing through said hole of said grounding metal and said at least one through hole of said at least one capacitor, and being electrically connected to another of said electrodes;
   at least one insulating tube covering said conductor;
   at least one insulating cover having one end inserted in said internal space; and
   an insulating resin filling spaces around said at least one conductor, around said raised portion and in said internal space, wherein:
   said one end of said insulating cover faces an inner surface of said internal space of said raised portion over a gap and said insulating resin fills said gap; and
   said inner surface of said internal space of said raised portion is provided with a plurality of projections facing opposite said one end of said insulating cover.

5. The high voltage capacitor of claim 4, wherein the layer thickness of said insulating resin at said gap is set at 0.1 mm or larger.

6. A magnetron utilizing a high voltage capacitor as a filter, wherein said high voltage capacitor is constituted of the high voltage capacitor of claim 4.

* * * * *